United States Patent [19]  [11] 4,266,896
Meier et al.  [45] May 12, 1981

[54] DEBURRING TUBES OR PIPES ON THE INSIDE

[75] Inventors: Friedrich Meier, Remscheid; Hugo Philipp, Hilden, both of Fed. Rep. of Germany

[73] Assignees: Mannesmann Aktiengesellschaft, Düsseldorf; Röchlingburbach Weiterverarbeiting GmbH, Völklingen, both of Fed. Rep. of Germany

[21] Appl. No.: 29,449

[22] Filed: May 7, 1979

[30] Foreign Application Priority Data

Apr. 14, 1978 [DE] Fed. Rep. of Germany ....... 2816895

[51] Int. Cl.³ .............................................. B23D 1/24
[52] U.S. Cl. .................................. 409/299; 407/114; 409/140
[58] Field of Search .............. 409/299, 140, 143, 309; 83/914; 407/114

[56] References Cited

U.S. PATENT DOCUMENTS

| 2,053,831 | 9/1936 | Jenkins | 409/299 |
| 2,900,879 | 8/1959 | Norton et al. | 409/299 |
| 2,923,208 | 2/1960 | Hotchkiss | 409/299 |
| 3,395,614 | 8/1968 | Dodson | 409/299 |
| 4,138,925 | 2/1979 | Schulte | 409/299 |

Primary Examiner—Z. R. Bilinsky
Attorney, Agent, or Firm—Smyth, Pavitt, Siegemund & Martella

[57] ABSTRACT

A tubular cutter with flared end and circular edge is obliquely held and centered by resilient guide elements, one in line (axially) with the edge, the other one acting radially opposite and axially between the first one and the edge. The edge has a larger diameter than the cutter is long (axially), and the latter has its interior contoured for smooth burr removal.

7 Claims, 5 Drawing Figures

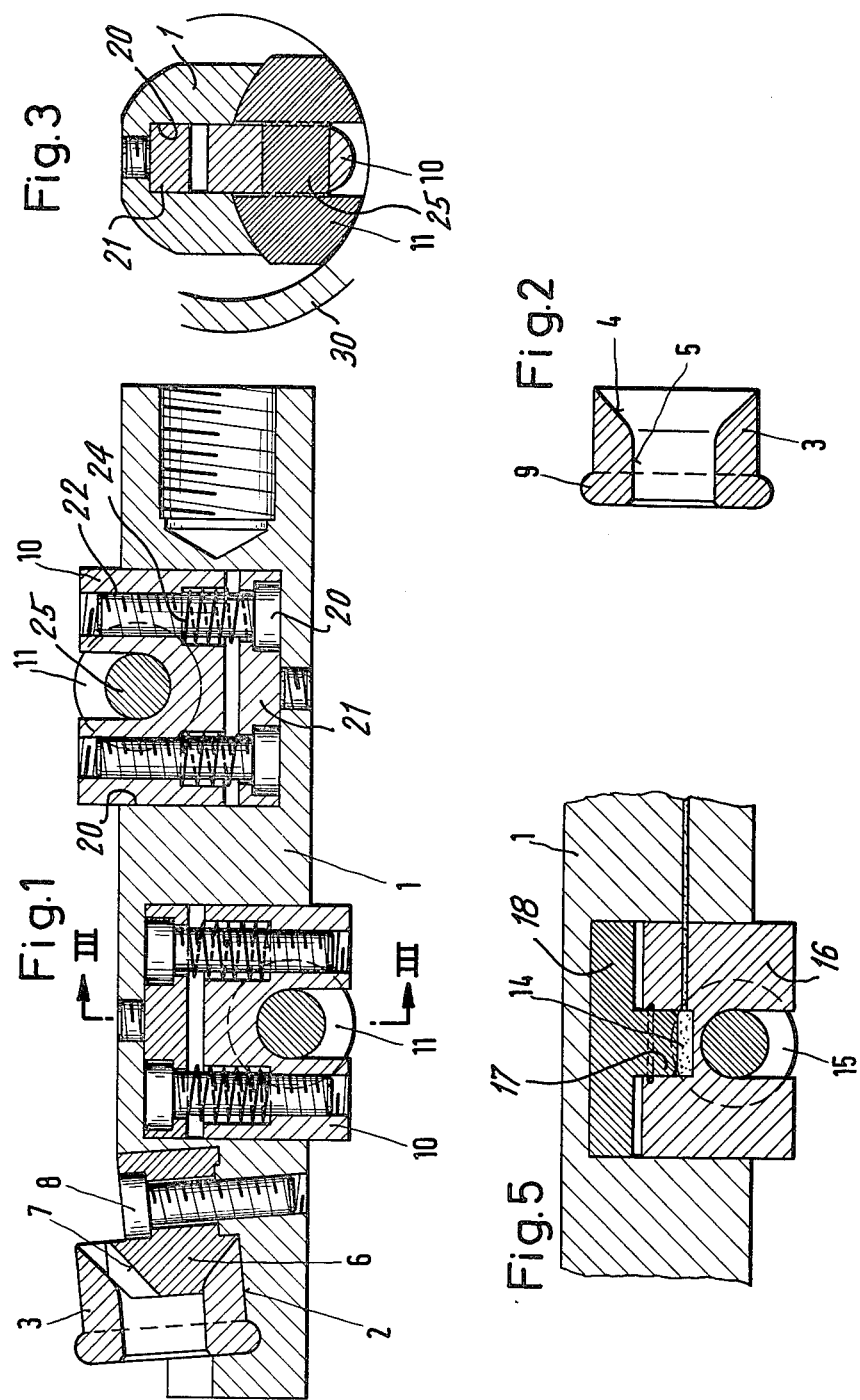

DEBURRING TUBES OR PIPES ON THE INSIDE

BACKGROUND OF THE INVENTION

The present invention relates to deburring the interior of a tube or pipe.

The burr is removed from the welding seam in the interior of tubes or pipes by means of particular tools. These tools include a tool holder for a cutter or scraper as well as means for guiding the cut-off burr; see for example German printed patent application 25 12 486, for a construction permitting the cutter or scraper to be exchanged.

The tool must be guided and held in the tube or pipe. German Pat. No. 707 485 discloses glide or roller elements for this purpose. German printed patent application 1,019,270 discloses balls or rollers for guiding a deburring tool through a pipe or tube.

Deburring tools, having scrapers or milling-type cutters, are frequently held on rods and usually must be adjusted to match the inner diameter of the pipe being deburred. Changes in the dimensions require readjustment of the tooling. Also, the known devices require frequent changes in the cutting or scraping tool which amounts to correspondingly frequent down times of the entire equipment. The cutter blades are frequently soldered or brazed to the respective holder, and it was found that tension results in the blades and they break rather easily, right away or after a short time of use only.

DESCRIPTION OF THE INVENTION

It is an object of the present invention to provide a new and improved tool for deburring the interior of pipes, tubes, and hollows in general along a longitudinal welding seam; the tool is to include a replaceable or exchangeable cutter and the exchange is to be made simple.

It is another object of the present invention to provide a deburring tool which covers a range of pipe diameters at a well defined cutting depth for each instance of application.

It is a further object of the present invention to provide a deburring cutter which avoids excessive penetration depths into the wall of the tube or pipe being deburred.

In accordance with the preferred embodiment of the present invention, it is suggested to provide a tool holder of elongated construction, having at or near one of its ends a contoured recess to receive and hold a tubular cutter having preferably a cylindrical interior smoothly merging into an outward flare which terminates in a circular cutting edge. This cutter is clamped to the holder, leaving part of its interior open for burr removal. The cutter is axially shorter than its edge is wide (diagonally) and has its axis obliquely oriented. The tool holder is positioned by resilient guide means preferably provided as a pair of guide elements, one being in line with the cutter, the other one being oppositely oriented and axially between the first one and the cutter. Each guide element may be a spring-biased shoe or a spring-biased or hydraulically biased pair of contoured rollers.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a longitudinal section view through a tool in accordance with the preferred embodiment of the invention;

FIG. 2 shows the cutter in the tool of FIG. 1, but drawn to a larger scale;

FIG. 3 is a cross section taken along lines III-III in FIG. 1;

FIG. 5 shows a portion of a longitudinal section view of still another modification, involving the guiding structure only.

Proceeding now to the detailed description of the drawings, FIG. 1 illustrates a tool holder 1 which is of uniform and elongated construction and has several recesses. One recess, located near one end of holder 1 receives a cutter element 3. This cutter is a short tubular part having a bead 9 and a tapered outwardly flaring portion 4 which becomes, or merges in, or terminates as the cutting edge 4a. This cutting edge is, of course, of circular configuration, and has a diameter which exceeds the axial length of the cutter 3 as a whole. The interior of element 3 is of cylindrical configuration 5, the transition between cone 4 and cylinder 5 is a gradual one.

Figure 4A:
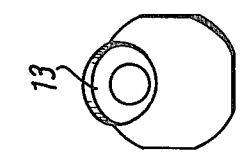
FIG. 4 is a longitudinal section through a modification of a tool as shown in FIGS. 1, 2, and 3, the modification involving guiding structure and cutter contour.

The cutting element 3 is placed into one, matchingly contoured recess in holder 1, a portion of that recess being further contoured to matchingly receive the bead 9. A clamping piece 6 of conical configuration, cone 7, is secured to the holder 1 by means of a threaded bolt 8 and holds cutting element 3 in place.

FIG. 1 shows that the clamping cone 6 does not fill the flaring or conical portion of the interior of cutter 3, but a duct remains, for receiving the cut-off burr and guiding it through the hollow cutter. The transition from conical to cylindrical interior of cutter 3 is smooth in order to avoid any impediment in the burr guiding. Moreover, the fact that the diameter of cutting edge 4a is larger than the axial length of the cutter aids further in the smooth and unimpeded guiding of the burr.

The cutter 3 can be reused by turning it until all portions of edge 3a have been blunted. Thereafter, it is simply exchanged.

A pair of oppositely directed axially oriented recesses such as 20 carry at their respective bottom a mounting plate such as 21 in each of which are held threaded bolts 22, their heads 23 being retained in recesses in the plate 21, and the shanks of the bolds pass through without threaded engagement.

These bolds are threaded into the legs of a U-shaped holder 10. Springs 24 urge the holder 10 away from mounting plate 21. The U-shaped holder 10 serves as cradle for a short shaft 25 for a pair of rollers 11. These rollers have a curved contour for engagement with the inner wall of a tube or pipe 30 to be deburred and in which this tool is held and guided and in which it runs.

The curvature of these rollers does not have to match the curvature of the interior of the pipe 30; a close match will occur only for one diameter, while only point or line contact is made between the rollers in the pipe's wall for other diameters. This is no detriment due to the symmetry of the roller support. The un-deburred seam runs between the rollers of each pair.

In view of the duplication of this rolling-type guiding equipment, the tube's wall is engaged along diametrically oppositely located paths. The tool is radially centered by operation of these four springs 24. Moreover, each guiding means is effective radially opposite the other one and the cutter is axially offset from both, in about the middle between them.

The oblique position and orientation of the recess 2 determines the orientation of the effective cutting blade or edge. On the other hand, bead 9 has a radial extension so that it engages the pipe's wall where having been deburred. The angle of orientation, the axial length of the element 3, the radial width of the bead 9, and the centered guiding by means of the rollers 9, all together determine very accurately the penetration depth of the cutting blade.

Figure 4:
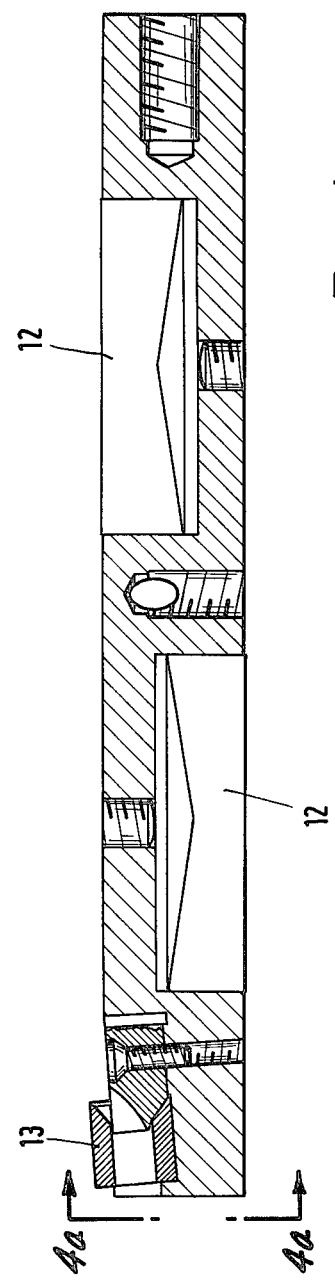

Turning now to FIG. 4, a basically similar tool holder is shown here, but the guide structure is replaced by slide or glide shoes 12 being mounted under spring bias in the recesses of the type which is used in FIG. 1 for mounting slide rollers. Additionally, the cutter 13 in this case does not have a bead, there being no matching recess in the holder accordingly. This simplified construction is used for deburring pipes or tubes of smaller diameter, e.g., below 20 mm.

Turning back for a moment to FIG. 1, one will see that the tool bears against the pipe's inner wall adjacent to the seam burr in two points by operation of the pair of rollers 11 being on the same side as the cutting edge, next to and to both sides of the seam. A third support point is provided by the bead 9 of the freshly cut surface of the deburred seam. Looking at the latter point as a pivot, pivoting about a horizontal axis (transverse to the tube's axis) will vary the penetration depth. Due to the provision of the downwardly directed, second set of support rollers; however, this pivoting is not possible; the tooling remains stably centered.

Turning now to FIG. 5, the guiding structure shown here includes rollers 15 of the same type as rollers 11. Also, the mounting structure 16 is similar to 10, except that spring bias is replaced by a hydraulic bias. For this, a piston chamber 14 is defined in the mount 16, cooperating with a piston 17 on the holder plate 18, being otherwise similar to plate 21. A second hydraulically biased pair of rollers is provided just as in FIG. 1 and for diametrically opposite action. One can, however, use one spring-biased pair of rollers and one hydraulically biased pair for the purpose of adjustment.

The hydraulic bias is established by applying hydraulic fluid to chamber 14. Moreover, one can see that in the case of an intentional imbalance, the holder 1 can be tilted, e.g., about the far point of engagement between bead 9 as a fulcrum or pivot and the tubes' wall to, thereby, vary the penetration depth of the cutting blade.

The invention is not limited to the embodiments described above, but all changes and modifications thereof not constituting departures from the spirit and scope of the invention are intended to be included.

We claim:

1. Tool for deburring the interior of a pipe or tube, comprising:
   a tool holder of elongated construction;
   resilient guide means in the holder for engagement with the wall of the tube or pipe to position the holder therein;
   an annular cutter, having an axis and a circular cutting edge on one end, the edge having a diameter which exceeds the axial length of the cutter, there being an obliquely oriented recess in the tool holder, the cutter further having an annular bead at the other end;
   means for clamping the cutter in the recess; and
   the cutter being mounted in and clamped to said recess at an upwardly inclined slope of said axis, the recess having a contour to match a cylindrical contour of the cutter and of the bead as placed into said portion of the recess, while a radially, oppositely located portion of the bead will engage a deburred wall portion of the pipe or tube in axial alignment with the operational cutting edge.

2. Tool as in claim 1, said annular cutter having a cylindrical inner wall smoothly merging in a radially outwardly flaring portion which, in turn, merges in the cutting edge.

3. Tool as in claim 1, the holder having further, radially oppositely located, axially offset recesses, the guide means being in these further recesses.

4. Tool as in claim 1 or 3, the guide means including a holder for a pair of contoured rollers, and means for radially outwardly biasing the roller holder.

5. Tool as in claim 4, there being spring means for providing said resilient biasing.

6. Tool as in claim 4, there being hydraulic means for providing said resilient biasing.

7. Tool as in claim 1, the guide means being at least one spring biased slide shoe.

* * * * *